Nov. 1, 1966 W. FREAR 3,283,315

SIGNAL RECEIVING AND INDICATING SYSTEM HAVING RECEIVER CONTROLLED INDICATOR OPERATED INTERMITTENTLY DURING SIGNAL RECEPTION TO PREVENT REGENERATION

Filed April 7, 1961

INVENTOR.
WILLIAM FREAR
BY
Fordyce A. Bothwell
ATTORNEY

United States Patent Office 3,283,315
Patented Nov. 1, 1966

3,283,315

SIGNAL RECEIVING AND INDICATING SYSTEM HAVING RECEIVER CONTROLLED INDICATOR OPERATED INTERMITTENTLY DURING SIGNAL RECEPTION TO PREVENT REGENERATION

William Frear, Jenkintown, Pa., assignor, by mesne assignments, to Philco Corporation, Philadelphia, Pa., a corporation of Delaware Filed Apr. 7, 1961, Ser. No. 101,480
6 Claims. (Cl. 340—286)

Figure 1:
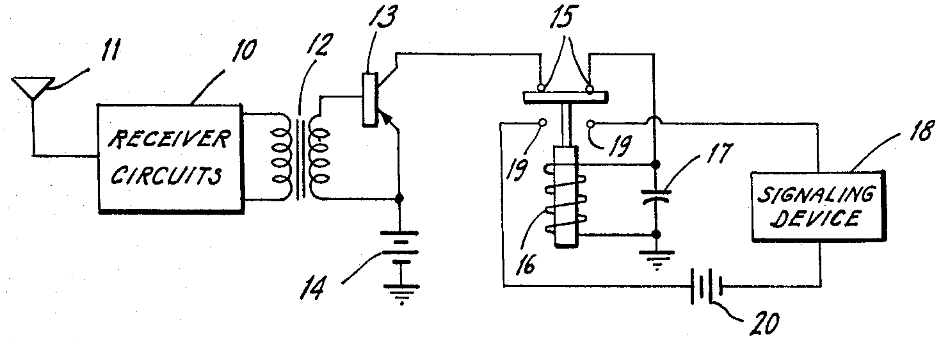

This invention relates to portable battery-operated radio receivers which are intended for use in a transmitter-receiver communication system to enable a person at the transmitter to signal a person carrying the receiver. Such a receiver is sometimes referred to as a paging receiver since its purpose in the system is to enable the person at the transmitter to summon or page the person carrying the receiver.

A receiver for such use may be a miniature radio receiver tunable or fixed tuned to the transmission frequency and employing an earphone to be worn by the person carrying the receiver. With the receiver turned on, the person at the transmitter can signal the person carrying the receiver at will. However such a receiver subjects the person carrying the receiver to the inconvenience of continually wearing the earphone. Moreover such a receiver necessitates transmission of an audio-modulated carrier even if the purpose of the system is merely to page the person carrying the receiver.

Alternatively, instead of an earphone the receiver may employ a signalling device, such as a small electric horn, operated from a battery by means of a relay energized by a received signal. This eliminates the objections to the use of an earphone but it gives rise to a serious problem. Since a signalling device consisting of a battery-operated electric horn is a high-current intermittent-contact device, it produces strong electrical radiation in proximity to the sensitive receiver which tends to pick up the radiation and maintain the signalling device in operation after the triggering radio signal has terminated. This of course is highly objectionable for a number of reasons. It blocks the receiver; it necessitates action on the part of the person carrying the receiver to stop the operation of the signalling device; and it tends to deplete the energy of the battery.

Attempts to solve this problem through the use of techniques such as filtering, shielding and isolation were unsuccessful.

One object of the present invention is to provide a satisfactory solution of this problem.

Another object of the invention is to provide a satisfactory solution without appreciably increasing the size, weight and cost of the receive rapparatus.

Other objects of the invention will be apparent as the description proceeds.

In accordance with this invention, there is provided an arrangement by which the signal receiver is caused to be intermittently effective during reception of a signal and the signalling device is caused to operate intermittently in bursts when the receiver is ineffective. In other words this arrangement alternately renders the receiver effective and causes operation of the signalling device. In the preferred form of the invention this alternating operation is effected by means of a signal-operated relay which is self-deenergizing and which controls the operation of the signalling device. Since with the arrangement of this invention the receiver is ineffective when the signalling device operates, any radiation from the latter cannot adversely affect the operation.

Figure 2:
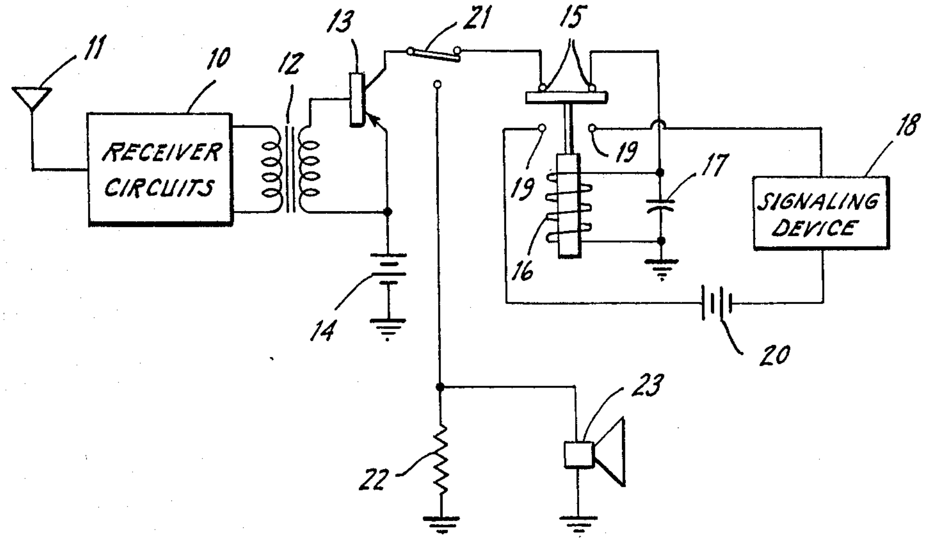

The invention may be clearly understood from the following detailed description with reference to the accompanying drawing wherein FIG. 1 is a diagrammatic illustration of signal receiving system embodying the invention; and FIG. 2 is a similar illustration of the same system with provision for receiving a message.

Referring first to FIG. 1, there is illustrated a receiving system of the type in which a high-power signalling device in proximity to a sensitive signal receiver is operated in response to signal reception by the receiver. Block 10 represents conventional receiver circuits, such as employed in radio receivers, for amplifying and rectifying a low-level radio signal received via antenna 11. The rectified signal is supplied via transformer 12 to a switching transistor 13 in such polarity as to turn on the transistor whose collector-emitter circuit includes battery 14, normally-closed relay contacts 15, and relay winding 16. A capacitor 17 is connected in shunt with said winding.

A signalling device 18, which may be an electric horn, is operated in response to the received signal through normally-open relay contacts 19, the energizing circuit for said device including a battery 20.

In the absence of a received signal, transistor 13 is off and the relay is deenergized. Therefore the signalling device 18 is also deenergized. Upon reception of a signal, transistor 13 is turned on and the relay is energized through contacts 15. The energization of the relay opens contacts 15, thus rendering the receiver ineffective, and closes contacts 19 to operate the signalling device 18. The opening of contacts 15 deenergizes the relay, and after closure of contacts 19 the relay armature returns to its normal position, opening contacts 19 and closing contacts 15. The operating cycle is then repeated, and the cyclic operation continues for the duration of the received signal.

Thus in operation as long as a signal is received the relay is intermittently energized and the signalling device 18 is also intermittently energized. The signalling device operates in bursts during which the relay-energizing circuit is opened and the receiver is ineffective. The rate at which the signalling device is turned on and off depends upon the capacitance of capacitor 17 and the impedance of relay winding 16. Upon cessation of the received signal, transistor 13 turns off, the relay is deenergized and the signalling device is likewise deenergized.

It will be seen that with the arrangement of this invention the signalling device cannot cause operation of the receiving system through radiation or feedback. The signalling device 18, being a high power device such as a horn, tends to maintain operation of the receiver as hereinbefore mentioned. However, with the arrangement of this invention, the signalling device is operated intermittently in bursts when the relay-energizing circuit is opened and the receiver is ineffective, and the operation ends abruptly when the received signal terminates.

Thus by means of the simple arrangement provided by this invention, the objectionable self-actuation of the receiving system is eliminated without appreciably increasing the size, weight and cost of the apparatus.

FIG. 2 shows the same system the provision for receiving a message. In this modified system, switch 21 enables switching from the relay circuit to a speaker circuit comprising resistor 22 and speaker 23. In the use of this system when the listener gets a signal from device 18 he throws the switch 21 to disconnect the relay circuit and to connect the speaker circuit. He can then receive a transmitted message.

While a preferred embodiment of the invention has been illustrated and described, it will be understood that the invention is not limited thereto but contemplates such modifications and further embodiments as may occur to those skilled in the art.

I claim:

1. In a signal receiving system, a receiver for receiving signals from a remote source, a signalling indicator located proximate said receiver for generating a perceptible indication and also generating concurrently with said perceptible indication an interference signal receivable by said receiver, a first circuit, first means connected to said first circuit and said receiver for energizing said first circuit in response to the reception by said receiver of said signal from said remote source and deenergizing said circuit in the absence of an input signal to said receiver, said first circuit including a relay having a winding and normally closed contacts serially included in said first circuit to effect intermittent operation of said relay during the reception of said signal from said remote source, said relay also having normally open contacts which are closed by the actuation of said relay, and an energizing circuit for said indicator including said normally open contacts whereby said normally open contacts effect only intermittent energization of the indicator during the reception of said received signal from said remote source to thereby prevent the generation of continuous interference signals by said indicator and continuous energization of said first circuit by said first means.

2. Apparatus according to claim 1, including a capacitor in shunt with the winding of said relay, whereby the rate of intermittent actuation of said relay and consequent intermittent energization of said indicator is determined by the electrical constants of said capacitor and said winding.

3. Apparatus according to claim 1 wherein said first circuit includes a transistor connected to control current flow through said series combination of said relay winding and said normally closed contacts and wherein said first means controls conduction through said transistor.

4. Apparatus according to claim 1 wherein said first circuit includes a transistor connected to control current flow through said series combination of said relay winding and said normally closed contacts, wherein said first means controls conduction through said transistor, and wherein said apparatus further comprises a capacitor in shunt with the winding of said relay, whereby the rate of intermittent actuation of said relay, and consequent intermittent energization of said indicator, is determined by the electrical constants of said capacitor and said winding.

5. Apparatus according to claim 1 including a sound reproducer, and manually-operable selector switch means for disconnecting said relay winding and normally closed contacts from said first circuit and for connecting said sound reproducer to said first circuit.

6. Apparatus according to claim 4 including a sound reproducer, and manually-operable selector switch means for disconnecting said relay winding and normally closed contacts from said first circuit and for connecting said sound reproducer to said first circuit.

References Cited by the Examiner

UNITED STATES PATENTS

| | | | |
|---|---|---|---|
| 2,188,159 | 1/1940 | Rockwood | 317—142 X |
| 2,208,125 | 7/1940 | Feingold | 340—331 |
| 2,213,834 | 9/1940 | Chase | 340—331 |
| 2,287,926 | 6/1942 | Zepler | 340—164 X |
| 2,760,134 | 8/1956 | Johnson. | |
| 2,899,547 | 8/1959 | Crow et al. | 340—311 |
| 2,969,486 | 1/1961 | Amfahr | 317—148.5 |
| 2,984,820 | 5/1961 | Kennell | 340—276 |
| 3,039,081 | 6/1962 | Smith | 340—312 X |
| 3,041,588 | 6/1962 | Malin | 340—384 X |

NEIL C. READ, *Primary Examiner.*

STEPHEN W. CAPELLI, *Examiner.*

H. I. PITTS, R. M. GOLDMAN, *Assistant Examiners.*